United States Patent
Knapp

[11] Patent Number: 5,967,699
[45] Date of Patent: Oct. 19, 1999

[54] METHOD AND APPARATUS FOR LAUNCHING A PIG IN A VERTICAL RISER PIPE

[76] Inventor: Kenneth M. Knapp, 1209 Hardy, Houston, Tex. 77020

[21] Appl. No.: 08/934,467

[22] Filed: Sep. 19, 1997

Related U.S. Application Data

[63] Continuation-in-part of application No. 08/784,602, Jan. 21, 1997.

[51] Int. Cl.[6] .................................................. B08B 1/00
[52] U.S. Cl. ...................................... 405/211; 15/104.061
[58] Field of Search ............................. 405/211; 15/3.5, 15/104.05, 104.061

[56] References Cited

U.S. PATENT DOCUMENTS

| | | |
|---|---|---|
| 3,025,118 | 3/1962 | Nooy . |
| 3,403,418 | 10/1968 | Knapp et al. . |
| 3,484,886 | 12/1969 | Girard . |
| 3,879,790 | 4/1975 | Girard ................................ 15/104.061 |
| 4,083,076 | 4/1978 | Girard ................................ 15/104.061 |
| 4,509,222 | 4/1985 | Knapp ................................ 15/104.061 |
| 4,603,449 | 8/1986 | Knapp ................................ 15/104.061 |
| 5,244,505 | 9/1993 | Allison et al. ...................... 15/104.05 X |
| 5,533,224 | 7/1996 | Knapp ................................ 15/104.061 |
| 5,625,917 | 5/1997 | Hawkins ............................. 15/104.061 |
| 5,795,402 | 8/1998 | Hargett, Sr. et al. ............. 15/104.061 X |
| 5,814,160 | 9/1998 | Orlando ............................. 15/104.05 X |

*Primary Examiner*—David J. Bagnell
*Assistant Examiner*—Tara L. Mayo
*Attorney, Agent, or Firm*—Gunn & Associates, P.C.

[57] ABSTRACT

A tension leg platform in deep water over an underwater wellhead system supports an upstanding pig riser. The riser ID is smaller than the shoreline ID delivering produced oil to shore. The shoreline is pigged by a tapered nose pig inserted into the bell nipple at the top, open end to enable pig passage down the riser compressing the pig body. The body is formed of N discs and N foam donut spacers to clean the shoreline ID.

20 Claims, 3 Drawing Sheets

METHOD AND APPARATUS FOR LAUNCHING A PIG IN A VERTICAL RISER PIPE

This disclosure is a continuation in part of Ser. No. 08/784,602 filed Jan. 21, 1997.

BACKGROUND OF THE DISCLOSURE

Pipeline pigs are extremely helpful in the operation of pipelines. Ordinarily, pipelines extend cross country, typically placed on the surface, but sometimes they extend under bodies of water. They can cross rivers and lakes. It's not uncommon for pipelines to pass under several bodies of water. In offshore circumstances, pipelines extend from production platforms perhaps 50 to 100 miles out in the Gulf of Mexico. Typically, the water is relatively shallow. In many places, the water is only about 100 feet deep even when the production platform is many miles offshore. In those instances, the platforms are fixed structures supported on the bottom. In deeper waters, platform erection costs become prohibitive. While two or three large platforms have been erected or perhaps have proceeded to the planning stage, it appears that the maximum limit for stationary construction of a platform is about 1,200 feet of water. Such platforms are extraordinarily expensive in that they require the frame structure as large as any of the tall buildings in the U.S. They are erected on shore and towed to an offshore location. They are deployed only when the production platform is known to be above a very prolific and highly productive field. A better approach now is the use of a tension leg platform. A tension leg platform involves a platform which is made with adequate buoyancy that it will float and hold the working deck properly above the wave action. It is held in place by cables which extend to the bottom and are anchored at the bottom. The buoyant body is held on flexible lines which are maintained in tension. It resembles a buoy which is anchored by multiple anchor lines extending to the bottom. This reduces markedly the amount of structural steel and the assembly required to assemble that structure into a supportive rigid framework. The tension legs are deployed around the platform and are anchored at the bottom.

The typical platform installed at offshore locations supports a complex amount of equipment on the deck for actual production. Indeed, the production platform may also temporarily support a drilling rig while the last of several wells are drilled. Ordinarily, a platform will not be installed unless several wells are serviced from the platform. While the number can be varied, it is not uncommon to terminate 30 to 50 wells serviced from a single platform. Many of the wells are deviated so that they actually reach bottom depth at desired locations scattered over a producing formation so that optimum production can be obtained. All the wells are therefore connected to the platform and are operated from the platform. Wellhead equipment (such as the Christmas tree) and surface gathering lines associated with land wells are not always placed on the production platform. It is desirable that wellhead equipment be located at the mudline. Typically, the wells incorporate conductor pipes to a mat or template which supports the casing and pipe strings. The many wells are terminated at the wellhead equipment located underwater. Producing wells are connected with a manifold to deliver the produced fluid and that in turn is directed into a flow line from the underwater template toward shore.

To make the example specific, assume that 40 completed wells terminate at the underwater template. Each well is provided with appropriate wellhead equipment. Wellhead valves direct their flow into a gathering line. Assume that the gathering line is a 16 inch line located in 1,000 feet of water. The gathering line delivers, under pressure, the produced oil which is pumped into the gathering line and flows to a shore location where the line emerges from the ocean. Assume that the gathering line is 200 miles long. The 200 miles of gathering line is exposed to cumulative collection of materials from the flowing oil. The materials in the gathering line often will coat the inside of the gathering line. Pipe coating is primarily dependent on the nature of the production and the temperature of the production fluids. If, for instance, the production fluids are extremely hot when produced, they will be cooled significantly in transit along the 200 mile gathering line. As cooling occurs, heavier molecules tend to coat on the pipe. It is possible that the inside diameter of the pipe will be markedly reduced by the cooling of the produced well fluids.

Sometimes, a producing well will produce small or great quantities of water which is laden with insoluble constituents. Again, the nature of the constituents will vary widely. It is however possible that they also will go out of solution and thereby plate the inside wall of the pipe. It is not uncommon for the gathering line to require cleaning periodically. Cleaning of the gathering line requires insertion of a pipeline pig into the gathering line. The pig is forced by the fluid flow from the underwater wellhead to the far end of the gathering line where it emerges onshore. In this particular instance, the gathering line must be pigged so that optimum production can be continued. If pigging is neglected, it is conceivable that the gathering line will become smaller and smaller in effective flow volume. Ultimately, serious problems can arise when the gathering line is severely plugged. It is not uncommon for the hardened materials which collect against the wall to reduce effective cross-sectional flow area by 50%. Because of that, pigging is absolutely essential to clean the line. A pig launcher is ordinarily used for lines onshore. In this instance, the pig launcher is not normally installed underwater. A vertical riser pipe is used for the pig launcher. The vertical riser must stand taller than the depth of water in which the wells are located. If the wellhead equipment is located at a depth of 1,000 feet, then the riser pipe must be 1,000 feet in height, and must have sufficient additional height so that the open end will not take any water. It is necessary to extend the pipe about 60 feet taller than the normal depth of the ocean. This vertical riser is 1,060 feet in height. This vertical gathering line riser is unwieldy. It must be stabilized laterally. Otherwise, ocean currents will force it to the side. It is sufficiently unstable in light of its relative height that it would otherwise topple. It is, however, tied to the platform above. This will add stability at the upper end so that the riser pipe will not fall over or be deflected by ocean currents or wave action.

With jack-up drilling rigs, no problem arises because the weight of the drilling rig is supported on the ocean bottom. With fixed platforms, weight does not pose a problem either because the weight is supported on the legs. With a tension leg platform, weight becomes a problem if it is excessive. In this particular instance, the gathering line riser poses a problem because it is heavy and it connects with the platform at one edge.

Again, the offset point of connection would not be a problem with a fixed platform. Here, the point of connection becomes a problem because that amount of weight at one side tends to tilt the platform because it is a floating platform. Because the platform is floating, both the weight and offset connection of the riser becomes a serious problem.

One way to overcome this is to reduce the diameter of the riser. Another weight reduction is to reduce the wall thickness. Wall thickness, however, is mandated by the depth of the water. If production is large, then a larger diameter gathering line is serviced by a larger diameter riser.

The present disclosure sets forth an improved system for gathering line pigging where the pig must be inserted through a vertical riser of several hundred feet in height. It sets forth a pig construction which is passed downwardly through the riser and then finally into the gathering line. If the vertical riser is reduced in diameter and wall thickness, a substantial reduction in weight occurs. In turn, a reduction in diameter of the riser requires a different pig construction. Therefore, another aspect of the present disclosure sets forth a different type pig. In particular, this pig is constructed to work with a bell receptacle or nipple at the top end of the riser. The pig is dropped into the riser, and lands in the bell. By gravity, it is caused to fall into the riser. Ultimately, it turns to the horizontal into the gathering line. The pig is used time and again until it is finally worn out.

The present disclosure thus describes both a riser pipe construction and a pig construction so that the pipe is made as light as possible, the pig is readily inserted, and yet the pig is permitted to shrink and then expand for actual transit through the producing line.

BRIEF SUMMARY OF THE PRESENT DISCLOSURE

This disclosure sets forth a riser pipe construction for use with tension leg platforms located in deep offshore waters where such platforms are connected with a riser pipe extending vertically down to the ocean bottom. A nipple with associated housing is installed at the top end of the riser pipe. It is offset to the side of the platform to avoid interference with drilling equipment on the platform. The riser pipe extends downwardly, and connects through a set of valves to a gathering line from an underwater template supporting a large number of wellhead systems terminating at a manifold. With a pump as required, the pressure is raised so that the produced oil and gas from the formation is delivered to the shore. The gathering line is cleaned by pigs dropped through the riser at the offshore platform. By appropriate valves, the pig is delivered into the line and the line directs flow to the shore. Periodically, the line is pigged. In one aspect, the riser is smaller in diameter than the gathering line to save weight. Moreover, the nose of the pig is constructed with a taper to enable it to fit into the launching nipple having a bell shape at the top of the riser. This permits the pig to be reduced in diameter, thereby enabling the pig to traverse the pipeline and to be received at the inlet for launching into the pipeline. The pig is constructed with alternating hard discs and soft donut shaped layers as will be detailed A curving nose on the pig enables easy insertion.

BRIEF DESCRIPTION OF THE DRAWINGS

So that the manner in which the above recited features, advantages and objects of the present invention is attained and can be understood in detail, more particular description of the invention, briefly summarized above, may be had by reference to embodiments thereof which are illustrated in the appended drawings.

DETAILED DESCRIPTION OF THE PREFERRED EMBODIMENT

Figure 1:
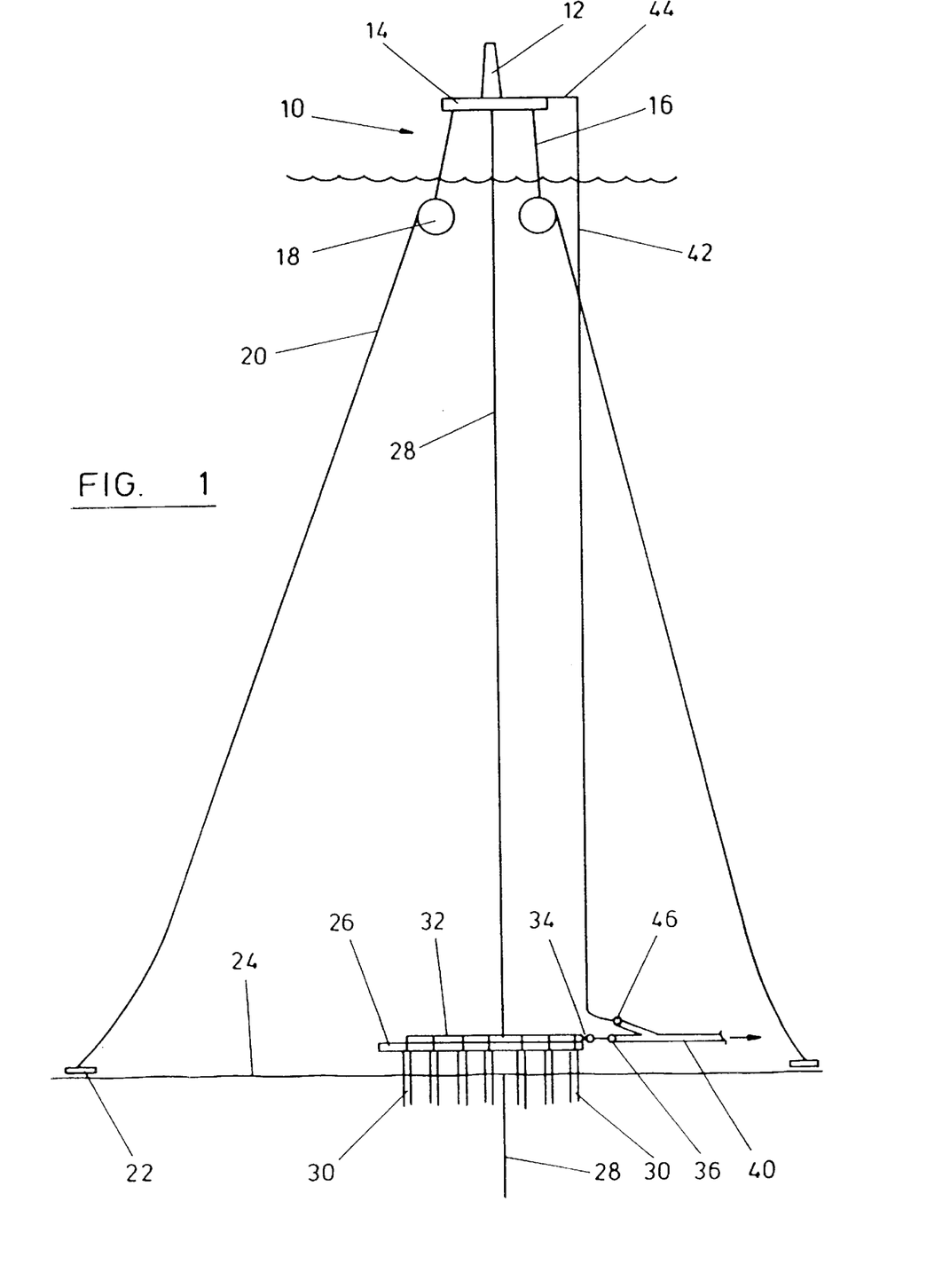
FIG. 1 is a schematic view showing a tension leg platform above a template on the ocean bottom supporting wellhead equipment and showing a riser pipe extending to a gathering line for delivery of produced oil to the shore.

Attention is now directed to FIG. 1 of the drawings where the numeral 10 identifies an offshore platform. The platform is the tension leg type which will be explained. Briefly, it includes a drilling rig 12 which is supported on a rig floor 14. A suitable framework 16 supports the platform above the water and above the wave action. It floats on one or more buoyant tanks 18. In a sense, it is somewhat like a semi-submersible drilling rig except that it is intended to be anchored at a specific location and left at that location. For anchoring, the platform and associated equipment is tied off with a set of tension legs 20. They function as anchor cables which extend outwardly to a remote footing 22 located on the bottom 24. The depth of the water can be typically anywhere from about 500 to about 5,000 feet. As will be understood, tension is placed in the cable which assures structural stability notwithstanding ocean currents and wave action.

The rig floor 14 must be high, and sufficiently high that wave action passes under it. The tanks 18 must be buoyant to keep the rig at the elevated position. The framework 16 must be sufficiently transparent or open so that wave action does not create large lateral forces acting against it. However, even if all this were accomplished, it would not stay on station without the use of side thrusters. It is held on station and does not move because it is tied to a particular location with the tension legs 20. They are divergent legs. In fact, there may be as many as six to twelve tension legs, some of which will be vertical and some of which will extend outwardly at an angle. They are more aptly described as anchor cables. They hold the buoyant body so that it is fixed in regard to the ocean bottom. Laterally deflecting currents and wave action do not move the platform significantly. The platform 10 is typically installed above a bottom supported template 26. The template 26 is constructed to rest on the bottom and to provide alignment for several wells. Assume as an example that the template aligns the upper ends of forty wells. It is shown in FIG. 1 at an intermediate stage, say with most of the wells drilled, completed and connected and yet drilling continues for another well. Once the tension leg platform is on location, drilling will continue until all the wells have been completed. By the time the last well has been completed, it often is then necessary to start workover procedures on other wells. A drill string 28 drills through the template 26, and continues to the depth for the well then being drilled. FIG. 1 shows in schematic form the drill string 28 extending below while another well is being drilled. It also shows several wells 30 which have been completed at an earlier time and they are collectively all joined with a manifold 32 so that production fluid is gathered. Significantly important wellhead equipment is mounted on the template and is appropriately connected with each of the wells. Such details have been omitted to enhance clarity. The several wells 30 deliver oil and gas to the manifold 32. The manifold 32 is connected with a manifold valve 34. That valve then connects with a line valve 36. The line valve 36 connects with the gathering shoreline 40 which extends from the offshore location.

Ignoring for the moment the fact that additional wells are being drilled, and directing attention solely to the production flow from the producing wells 30, they deliver their flow through appropriate wellhead equipment into the manifold 32 and the shoreline 40. Assume that the shoreline 40 is a sixteen inch line. Assume also that oil and gas are produced. Assume for the moment that the production is at an elevated temperature of perhaps 200° but it is subsequently exposed to temperature stabilized water at the bottom of the sea and is cooled while flowing. If any water is produced with the oil, it also will be laden with salts. Accordingly, the shoreline 40 is likely to require pigging often. If there is any trace of $H_2S$ in the flow, that may impact with the steel of the shoreline 40 and cause some corrosion. Also, water in the produced fluid may produce some corrosion and rust. As the temperature is dropped, the heavier molecules in the produced oil and gas may form a coating on the inside of the pipe. This coating can range from heavy paraffin or waxlike accumulations and may include mineral constituents. It can also have a striking resemblance to scale collected in water pipes, i.e., typically resembling $CaCO_3$ deposits. Typically, coatings result from many reactions including corrosion of the steel making up the pipeline, paraffin or wax on the pipe and also other mineralized sediments. Preventative maintenance strongly urges that the pipeline 40 be pigged periodically so that line capacity is not lost.

If the shoreline 40 were not underwater, it would be a straightforward matter to install a pig launcher and pig trap at several locations along the line. Pigs placed in the launcher are periodically forced into the line. A pig trap is used at the remote end to catch the pigs after they travel the line. A proper pig program determines the needs and assures that pigs are introduced into the line with adequate frequency for cleaning. In this instance, it is not possible to install a pig launcher for the shoreline 40. There is no easy way to get the pigs to the pig launcher.

The weight on the platform 10 is a limiting factor FIG. 1 has been simplified by simply showing a drill string 28 extending through the ocean. As a practical matter, this is a simplification. Conventional drilling procedures require that the drilling be conducted through a larger pipe known as a conductor pipe. The drill pipe 28 will typically have a diameter of about four to five inches. However, such drilling is carried out through a conductor pipe which can be anywhere from about 18 inches up to about 30 inches in diameter. Of necessity, this defines a large weight which is suspended from the platform 10. The conductor pipe would otherwise resemble a tall smokestack requiring protection against lateral forces. In common practice, this pipe extends above the surface of the ocean and hangs under the platform 10. This riser pipe of substantial weight ties the platform 10 to the template and provides a large increase in platform weight. The riser just mentioned is the conductor pipe around the drill string 28. A second riser is the riser line 42 which extends to the deck 14. It is shown with a cantilevered catwalk 44 extending out to the end of it. It is off center and poses a problem in adding weight which is off center. This would otherwise tip the platform 10. This offset weight is quite substantial, and can be equal to the weight of the riser pipe surrounding the drill string 28. Using the example of a sixteen inch shoreline 40, the riser pipe 42 is smaller and lighter than the conductor pipe around the drill string.

RISER CONSTRUCTION

The riser 42 for this system is a vertical pipe. It has an upper section which is made of a specified wall thickness and then a lower section which is somewhat thicker. The thickness must be increased eventually with depth. Water pressure from the exterior increases with depth. The pressure on the exterior of the riser 42 must be resisted by the pipe construction and the pipe is therefore made stronger by using a greater wall thickness. Significantly, the riser 42 is built to an inner diameter, ID, which is a specified ratio with respect to the shoreline 40. This reduction in diameter enables the weight of the riser 42 to be reduced significantly. The riser 42 is anchored at the lower end through its connection with the wellhead equipment located underwater. That ties the riser to the template 26 and the needed connection made for the riser is accomplished between the riser and the gathering line or shorline 40. Preferably, a valve 46 is installed in the line so that water does not accidentally enter the gathering line 40 through the riser 42. The riser connects with the gathering line through the valve just mentioned so that pigging operations can be controlled from the surface even though the valve is located underwater. The valve 46 is momentarily opened to admit the pig into the gathering line. The valve, when opened, equalizes pressure from the lower end of the riser 42 and into the pipeline so that the pig is properly pressurized to flow forwardly into the gathering line. Pressure behind the pig is momentarily increased and pressure forward of the pig is momentarily decreased so that the pig is admitted to the line 40.

ADVANTAGES OF THE PIG FOR PIPELINE CLEANING

Figure 2A:
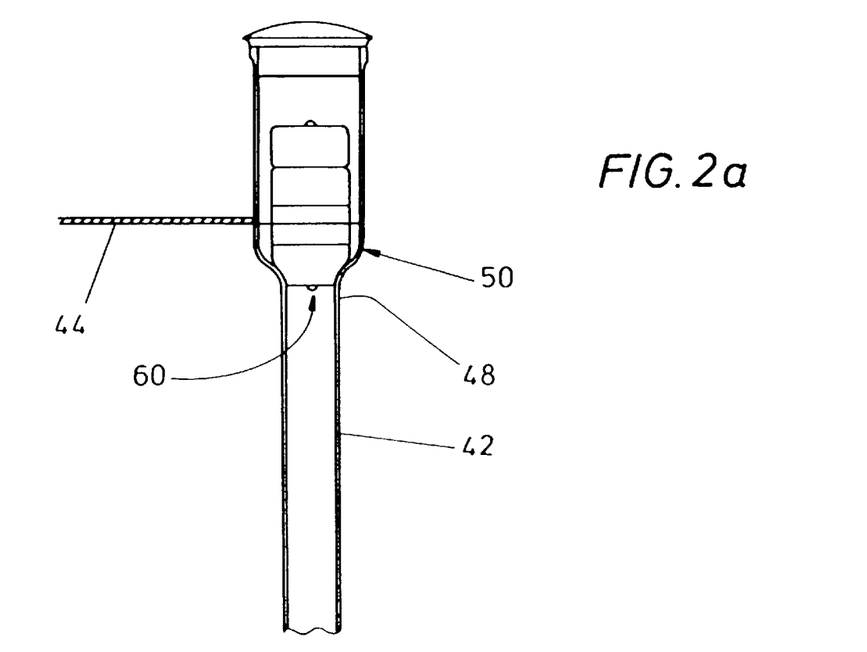
FIG. 2*a* is a detailed view of the upper end of the riser pipe shown in FIG. 1 and including details of construction at the top end.

The present pig 60 shown in FIG. 2a has a specially modified leading disc. Canting or hanging at the time of insertion into the bell is the greatest difficulty involved in pig loading and pipeline cleaning. For this, the pig is constructed with a special leading disc. As will be detailed in the description of the preferred embodiment, the leading disc is shaped so that entry is accomplished readily without canting. Should canting occur, pig insertion becomes problematic. It is even more difficult if it requires attendance of service personnel to handle the pig and reload, as it were, using an overhead hoist and hand labor. In light of the physical deployment of the riser pipe with respect to the rig platform, this may require personnel to climb out on the cantilevered catwalk 44 located between 60 and 100 feet above the water. This may also require the personnel to handle the pig without mechanical leverage or assistance from the catwalk. It is not uncommon for a pig to weigh as much as 50 or 100 pounds depending on the number of discs and construction of the pig. With regard to the pig of the present disclosure, even in that instance, pig weight is substantial because the number of discs or cups in the pig can be increased dependent on the desired construction.

BELL NIPPLE CONSTRUCTION

The upper end 48 of the riser 42 (see FIG. 2a) is constructed with a bell nipple 50. In effect, the nipple 50 serves as a funnel to guide and direct the pig which is dropped into it. It helps align the pig for entry into the riser. If the pig is at a canted position, entry may not be smooth. It is possible for the pig to snag at the point of entry and resist entry. The bell nipple 50 provides proper alignment of the pig. At the time of insertion of the pig into the bell nipple 50, the pig 60 is normally hoisted above the riser and dropped into the bell and is centered by the downwardly tapering wall of the bell nipple. This centering puts the pig 60 in the proper position for entry so that subsequent travel along the pipeline can be accomplished. The beginning step, however, is one that poses real problems, i.e., the pig will snag when it is canted. To avoid canting, the pig 60 is cantered at the bell nipple 50 for entry into the riser. This entry enables the pig to be properly aligned and started on its travels in the riser. It falls down the riser driven by gravity. While gravity will move the pig down the riser, a hydrostatic head can be added behind the pig to force it downwardly at a greater rate. Moreover, if any hydrostatic head is added behind the pig, its downward travel can be speeded by the weight of the hydrostatic head. For instance, one barrel of liquid can be added behind the pig to add about 400 pounds of weight. As the pig falls in the riser, it may compress air below the pig. Compression of fluid at the bottom of the riser can be moderated so that the fluid does not serve as an accumulator, otherwise slowing pig fall in the riser. A riser vent line is optionally installed so that this does not pose a problem.

Figure 2B:
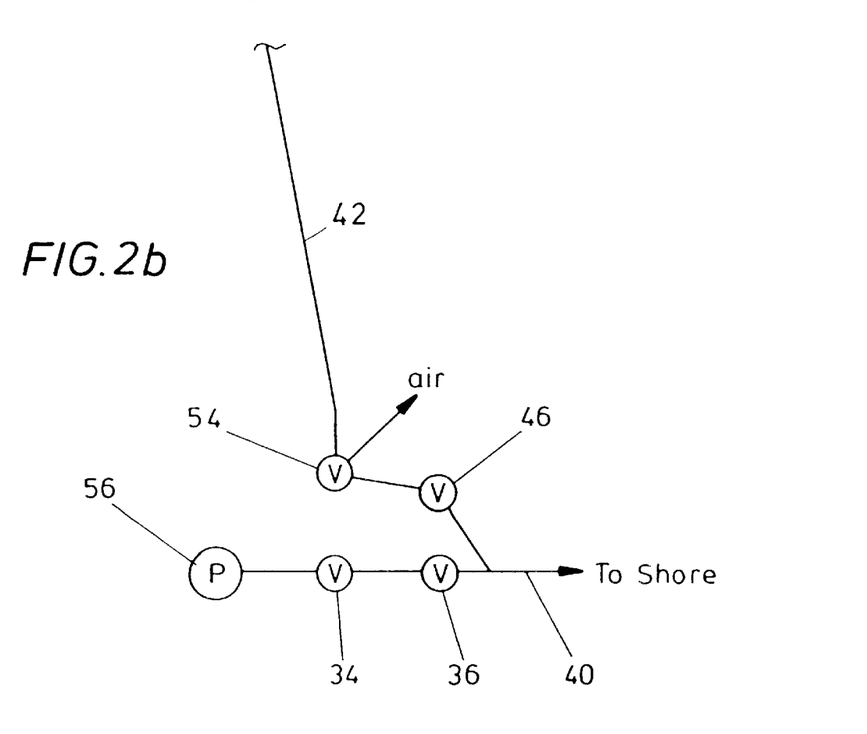
FIG. 2*b* illustrates certain aspects of the valving system at the lower end of the riser pipe.

The riser 42 is drawn at one scale at the upper end of FIG. 2a and is modified to a simple schematic line drawing at the bottom as shown in FIG. 2b. Again, the riser pipe 42 may be several hundred feet tall and can easily be as tall as 5,000 feet. At the bottom, there is an air vent valve 54 which enables venting of air captured under the pig 60. Indeed, as the pig falls by gravity, it will compress fluid in the riser pipe that is below it. If any sea water gets into the riser pipe 42, it is also expelled through the valve 54.

Some representative pressures will be given. In the first instance, the wells are assumed to be relatively deep because the depth of water is fairly great. Deep wells normally produce at relatively high pressures. However, wells eventually are depleted and have to be pumped, and FIG. 2b therefore includes a pump 56 which is supported on the template 32. If formation pressure is depleted, the pump delivers the oil and gas at pressure through the valve 34 and that connects with the valve 36 and delivers the pumped fluids at elevated pressure. Assume for purposes of discussion that the operating pressure in the line 40 is about 2,000 psi. The pig 60 is dropped through the riser and travels along the riser to the valve 46. The valve 46 blocks passage of the pig 60. As the pig falls, the valve 54 is opened to vent air and other fluid from the riser below the pig. Timed operation of the valve 46 enables opening so that the pig can travel from the riser into the line 40. At the time that the valve 46 is opened, the valve 34 is preferably closed to reduce pressure in the line 40 so that the pig does not encounter a pressure resisting entry. Thus, the pig has a positive pressure drive behind it pushing it from the riser 42 through the valve 46 and into the shoreline 40. Then, the pig is launched. After it passes through the valve 46, the valve 46 is closed. By appropriate timed operation of the valves and increase of pressure from the pump 56. the pig is then driven forwardly in the line 40 for travel to shore.

PIG CONSTRUCTION

Figure 3:
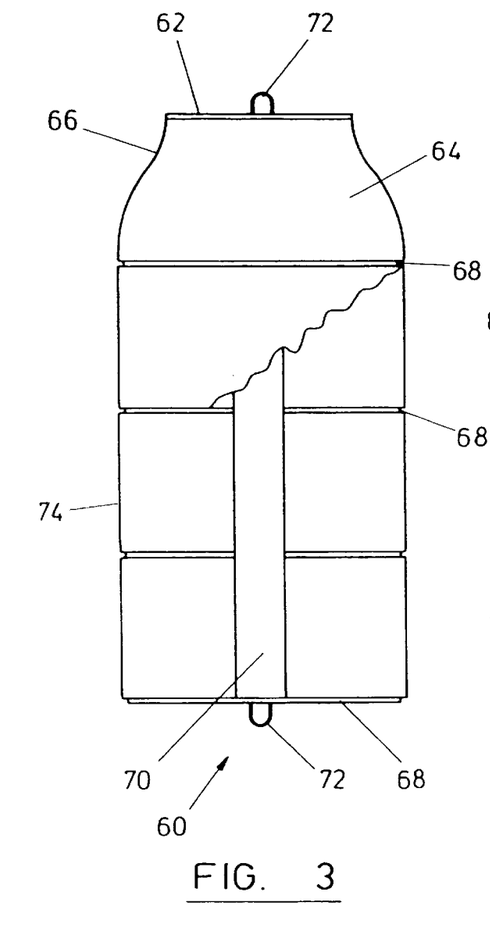
FIG. 3 shows a pipeline pig for use with the present disclosure which is inserted into the bell nipple on the riser pipe in FIG. 2.

FIG. 3 of the drawings shows one version of the pig 60. The pig 60 features a leading circular disc 62 of specified thickness and hardness. The disc 62 will be detailed later after review of aspects of the other disc that makes up the pig. The second layer is a foam layer 64 with a tapered outer face 66. It is bell shaped, more or less conforming to the shape of the bell nipple 50 shown in FIG. 2 of the drawings. Briefly, it is tapered so that it is able to fit into the bell nipple with the inverted position of FIG. 2a at the time of insertion. The remainder of the pig 60 is formed of several discs 68 which are equal in diameter, hardness and thickness. They are all centered around a post 70. The post 70 extends from one end to the other in the pig 60. The post also serves as an anchor for a rope eyelet 72. Similar eyelets are found at both ends for ease of handling the pig. The several discs 68 are separated by spaced donuts 74. They are formed of softer foam. Details of the foam discs will be given below along with the harder discs.

To reduce weight and to improve sealing with the pipeline, the several donuts 74 are made of a soft foam. Typically it has a weight in the range of about three to about twelve pounds per cubic foot. One version is open cell polyurethane. It forms a wiping surface against the pipe when traveling along the line 40. The open cell structure enables liquid to flow through it. The size of the donuts should be noted. Assuming that normal operations are intended, the foam donuts 74 are sized to 100% or greater of the pig diameter. A typical range is about 102 to about 106% of the actual ID of the pipe. If the ID is sixteen inches, then the open cell foam structure is shaped to a diameter of about 16.2 to about 16.5 inches. The preferred weight is approximately five pounds per cubic foot, and the foam discs 74 are conveniently cut to a thickness of about four or five inches.

The harder discs 68 are made with a hardness of at least about 70 or 75 on the Shore A durometer scale. It can be as high as about 90. An ideal hardness is about 80 durometer. For pipes ranging from about 10 to about 20 inches in nominal measurements, the foam is about one-half inch larger in diameter than the discs 68. The central core 70 is about 1.5 inches in diameter for pipes of about 10 to 20 inch size. The several discs 68 typically have a common thickness. Typically, the thickness is about one-half inch or greater for pipes ranging between 10 and 20 inches. The harder discs are made of cast polyurethane to the hardness noted and are made about 1% greater than the nominal ID. The foam donuts are preferably about 5% greater. This difference of about 4% represents approximately one-half inch difference between the discs 68 and donuts. The several discs 68 are therefore equal in diameter and are replicated so that there are N of these discs. In the preferred embodiment, and behind the nose disc 62, the discs 68 number typically from three to about eight. The preferred number is around four or five.

Using the construction to achieve the profile shown in FIG. 3, the pig is able to enter the bell nipple 50 easily. The pig is launched in a manner to be described but at the time of launch, it will be forced to squeeze in, thereby accommodating reductions in size. Examples of this will be noted below.

Figure 4:
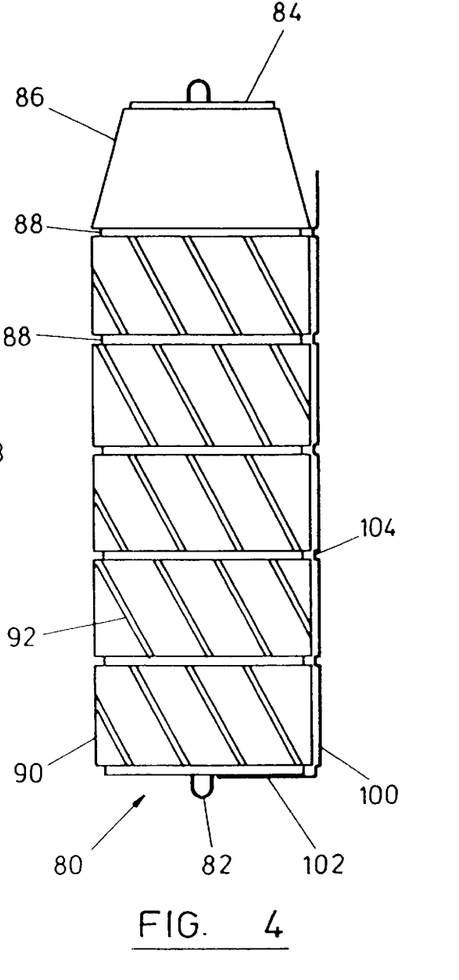
FIG. 4 shows an alternate embodiment of pig construction for the riser of the present disclosure.
Figure 5:
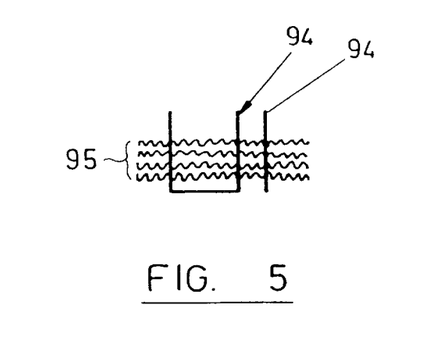
FIG. 5 shows an abrasive strip.
Figure 6:
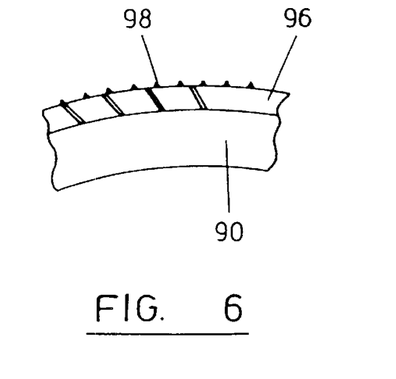
FIG. 6 shows another abrasive strip.

A second embodiment is identified generally at 80. It has a similar central post (on the interior and therefore not shown in FIG. 4) and terminates in the same rope eyelets 82 for easy handling. It is equipped with a leading harder disc 84 and a tapered foam disc 86. Similar discs 88 are made of harder material and have dimensions that will be described. There are several foam discs between adjacent discs 88. The several foam donuts 90 are made of the same material as the foam donuts 74. Dimensions will also be given for this embodiment 80. One particular aspect of the pig 80 is the incorporation of abrasive strips at 92. The strip 92 is an abrasive material which is applied in helical stripes. An example of this is illustrated in FIG. 5 which is a cross sectional view showing the material used to provide an abrasive strip. It has been found that carding cloth used in textile mills is quite acceptable. Carding cloth is a woven cloth belt or strap. It is typically made as shown in FIG. 5 with several layers of cloth. This provides a base of perhaps four to seven cloth layers. A U-shaped staple 94 is inserted through it. The several layers 95 of cloth support the two points of the staple 94 in an upright position as illustrated. Other staples are driven through the cloth so that the points of the staple legs are positioned collectively as a scrapping surface. It is easy to spread over one hundred points into a square inch, and indeed, the number of points can be increased significantly above that. Because each staple is equipped with two legs and points, they are held in an upright position by the several layers of cloth. The staples and cloth construction provide an abrasive strap which is somewhere between about one and two inches in width and is embedded in the foam donut for bonding at the time of manufacture. FIG. 6 shows another form of the abrasive helical stripe 92. In this particular embodiment, the foam donut 90 is provided with a relatively thin layer 96 of harder polyurethane. As before, the donut 90 is formed with a density of about five pounds per cubic feet therefore defining a relatively soft and pliable structure having a harder ribbon on it. The ribbon 96 of harder polyurethane is much denser and has a hardness approximately the same as that of the several discs 68 and 88. It is relatively thin, perhaps up to about one-quarter inch in thickness and the width is typically around one to two inches. The hard polyurethane strip is applied in a spiral or helical fashion and the outer surface during curing is used to embed tungsten carbide particles 98. The particles define sharp points which are well bonded to the body of the strip. Whether the metal points on the staples shown in FIG. 5 are used, or the tungsten carbide of FIG. 6, both provide effective abrasive surfaces. In addition to that, the helical or canted installation of the strips rotate or spin to the pig. They function in the same way as does rifling in the barrel of a rifle. The helix angle is typically about 30° to 60°.

Consider now relative dimensions of the discs shown in the embodiment 80. The donuts 90 are oversized again by about one-half inch. The discs 88 are about 1% or 2% oversized. The foam donuts are larger and are preferably about one-half inch larger so that they are built to a 4% to 6% over gauge dimension. The abrasive materials are raised above the surface of the donuts 90. The staples as shown in FIG. 5 or the randomly distributed abrasive particles 98 shown in FIG. 6 are raised above the surface of the donut by a fraction of an inch, typically about 0.1 to 0.3 inches for pigs in the range of about 10 to 20 inches diameter. The donuts 90 can otherwise resemble the donuts 74 previously discussed. The discs 88 resemble in size and hardness the discs 68.

Consider now the relative ID of the riser 42 compared with the shoreline 40. If the shoreline has an actual ID of sixteen inches, it is possible to make the discs 62 or 84 at the front or nose end of the pigs as small as twelve inches. In other words, the leading end of the pig is reduced in size by up to about 25% Using this as an outer limit, the pig preferably has a leading nose end which is about 80% of the diameter of the remainder of the body. The range can typically be about 75% or 76% at the smallest and up to about 85% at the largest Defining the actual pipe ID as 100%, the first foam discs 64 and 86 thus have a bottom (or maximum) diameter of about 104% to about 108% at the most. These donuts 64 and 86 taper down to about 75% or 76%. Again using the same base, the discs 62 and 84 are preferably about 75% to about 85% in diameter. The hardness and thickness is common to the several discs 68 and 88. The number N for both pigs 60 and 80 are in the same range.

ADVANTAGES OF THE FOAM DONUTS

One aspect of the pig of this disclosure is the difference in structure of the two different types of circular elastomeric members used in the assembly of the pig. One of the two different members is the relatively hard discs built to about 1% or 2% over size in comparison with the pipe ID. By contrast, the foam donuts are quite different. The benefit of assembling the pig with alternating harder discs spaced by foam donuts is believed to derive from the relative hardness and softness of the two components. So to speak, when the pig is forced along the pipeline, drag around the peripheral edge of the hard discs deflects them around the edges. The outer edge is bent backwardly. It deflects somewhat. The central portions of the disc are bowed forwardly. The outer edge bends to the rear, creating a curvature at the edge or lip all the way around the outer edge. When flowing in one direction in the pipe, disc bending occurs in this fashion. When the same pig flows in the opposite direction, the harder disc is bent in the other direction. Whether bent to the right or left, such bending is primarily around the outer edge. Bending of the hard disc deforms the soft foam in the adjacent donut. It is much more pliable, and has less resistance to bending. It is able to deform significantly. Yet, when free of deformation, the foam serves as a spacer which aligns the hard disc to a planar condition. Accordingly, it can be readily said that the hard discs are bent to a convex shape (the central portion is bowed forwardly) and the foam donuts conform because they are adhesively joined. Yet, some restoring force is provided so that the alternating layers forming the pig body are restored consistent with the original construction when removed from the pipeline.

The foregoing is true when the pipeline pig is input to the shoreline for which it is designed. For instance, assume the shoreline of a nominal 24 inch size is cleaned with a pig having about 1% or 2% over gauge diameter for the hard discs. One percent of 24 inches is about 0.24 inches. A 2% over gauge disc would therefore be about 0.48 inches. For pipe of that size, this is an acceptable measure of size for the disc. Typically, making the hard disc to this size makes fairly good sealing and long life.

When the pig is inserted in the bell nipple, it will collapse to a smaller diameter pipe by compressing as described above. The maximum bend is about one-third, i.e., insertion of a 24 inch pig into a riser as small as 16 inches. Compression to that amount seems to be close to the limit. While it is possible for the hard disc to snap back after greater deformation, it is possible that shear stresses introduced at the interface between the different types of material may pose a risk of damage.

SEALING ABILITY ENHANCEMENT

Leakage around this pig is limited. In fact, the pig of the present disclosure can be used as a batch separator. The pig of this disclosure is adapted for sealing while traveling through a pipe with high quality product separation. If enhanced separation is desired, it can be obtained by mounting added hard discs on the pig body. In this instance, the number of hard discs (represented by N) can be increased from a typical short body of perhaps two or three discs up to a value of six or seven. That assures much better sealing across the pig.

When the pig of this disclosure is inserted into the riser, adding well fluid behind the pig enables enhanced pig travel down the riser with the weight of fluid on the pig. As appropriate, a single slug of an appropriate or selected liquid can be placed behind the pig. Most conveniently, the slug is a measured quantity of well fluid which is obtained from any production source in the field, for instance, oil which is obtained through production of another well from the same platform. In all instances, the amount and nature of the fluid can be varied. The fluid is typically selected so that it will not pose a problem in mixing with the production fluids flowing in the shoreline.

METHOD OF MANUFACTURE

As mentioned in the parent disclosure, the present pig can be formed layer by layer from the bottom. Typically, a long cylinder of shaped foam is cut to form individual donuts used in a casting process. In the parent disclosure, sequential fabrication from bottom to top is discussed and illustrated. That process if quite acceptable for the manufacture of the two component pigs which are set forth in this disclosure. As an alternative, a mold 100 is used as illustrated in FIG. 4 of the drawings for casting. The mold is separated somewhat from the body of the pig 80 so that the profile of the mold can be seen. The mold 100 in FIG. 4 is constructed with a set of rings protruding inwardly. The mold is preferably rested on a flat bottom surface 102 to enable the lower end to cast to a flat surface. The donuts are cut and positioned in the mold between the rings 104. As observed, the rings extend inwardly ever so slightly to define a shoulder to prop an adjacent donut. They position the adjacent donuts parallel with a uniform open space between the donuts. The individual donuts are hollow (note the construction in FIG. 3) so that a single pour of the liquid plastic material will suffice. This forms an integral cast structure comprising the center post and the several discs. While the first disc poured is the one at the bottom, the pour is continued until each disc fills the gap between the two adjacent donuts. The post is simultaneously and jointly cast in place.

Pouring continues until the top full scale disc 88 is in the mold. Once it has been poured, the topmost tapered donut is then positioned in the mold and the pour of the uncured liquid is continued. An interruption of a few seconds while positioning the tapered foam donut 86 in place poses no problem. It is placed in the uncured hard disc and pouring continues. A simple ring placed on the top end of the donut 86 confines lateral spread of the nose disc 84 as it is poured also. By using this approach, the several hard discs between adjacent foam donuts are formed to approximately the same diameter with good consistency, and they are formed to approximately the same thickness. Variations in disc diameter are substantially nil. Variations in thickness are less important but thickness remains fairly consistent so long as the donuts are consistently placed in the mold. The last disc 84, being smaller in diameter, is the last increment of the liquid pour. The time interval required for making the entire pour is only two or three minutes. Since the curing interval is typically many minutes, perhaps from sixty to three hundred minutes. the hard discs and the central post through the cast pig form a quality monolithic cured structure without internal flaws as a result of momentary interruptions while pouring the liquid.

Prior to pouring, it may be desirable to place an elongate nylon rope in the central donut holes. The rope is positioned so that the donuts are centered around it. The rope is then cast in the post through the pig and forms the rope eyelets 82 shown in FIG. 4. This enables easy handling of the finished pig for launching.

In one last aspect of assembly, the abrasive strips shown in FIGS. 5 and 6 are assembled to the individual donuts. This preliminary assembly can be done prior to the liquid pour forming the hard discs.

BI-DIRECTIONAL OPERATION

As shown in FIGS. 3 and 4, the narrow nose portion in inserted first and the pig therefore runs in the direction of the narrow nose. Interestingly, were it not for the problem of insertion through the riser (see example in FIG. 2a), the pig can readily be inserted to run in the opposite direction. For actual pipe cleaning in the shoreline, the pigs 60 and 80 both operate bi-directionally. Because the nose portions are substantially not in contact with the sidewall of the pipe, the pig operates in a bi-directional mode. Cleaning is substantially the same when traveling in either direction. The nose that tapers to a smaller diameter in the embodiments 60 and 80 is of great advantage at the time of insertion.

While the foregoing has been directed to the preferred embodiments, the scope is determined by the claims which follow.

I claim:

1. A method of pigging a shoreline from an underwater wellhead connection to the shoreline comprising the steps of:

(a) positioning a pig receiving riser comprising
      (i) an insertion end above a body of water and connected to a bell nipple for aligning a pig prior to insertion into said riser,
      (ii) a lower end, and
      (iii) a vent valve in close proximity to said lower end, wherein
      (iv) said riser connects at said lower end by means of a valve to said shoreline to deliver the pig into the shoreline;
   (b) defining said insertion end on the riser having an inside diameter less than an inside diameter of the shoreline;
   (c) forming an elongate pig having a lead nose portion comprising hardened apex material and body portion wherein said body portion is sized to wipe the interior of the shoreline, and the nose portion is reduced in diameter to insert into said insertion end of the riser; and
   (d) moving the pig from the insertion end of the riser into the riser and then into the shoreline for travel along the shoreline.

2. The method of claim 1 wherein step (b) further includes the step of defining the shoreline inside diameter as 100% and wherein step (c) further includes the steps of forming the pig with N discs having a disc diameter of greater than 100%, and positioning at least N−1 resilient donuts adjacent to said discs, and making said donuts to a diameter of 104% or greater, and wherein N is a positive integer.

3. The method of claim 2 wherein step (c) further includes the step of forming the N−1 donuts of foam plastic material having a density of about five pounds per cubic foot.

4. The method of claim 3 wherein step (b) further includes the step of forming the inside diameter of the insertion end of the riser between about 75% and 85%, and wherein step (a) further includes the step of closing said riser at the valve and the vent valve until pig insertion.

5. The method of claim 1 wherein the step of forming includes forming the pig with a nose disc and then a nose donut wherein the nose disc is made of material harder than nose donut material and is sized to fit into the riser, and the pig body is formed of at least one disc and one donut, and said at least one pig body disc is sized equal to or larger than said shoreline inside diameter and said donut is larger in diameter than said at least one disc.

6. The method of claim 5 wherein step (d) further includes the step of inserting the nose disc into the insertion end and then forcing the pig body into the riser while reducing the pig body diameter compressively, and including the step of dropping the pig into the shoreline.

7. The method of claim 6 wherein step (d) further includes the step of moving the pig from the riser into the shoreline by creating a pressure drive behind the pig greater than the pressure in the shoreline.

8. The method of claim 7 wherein the step of creating a pressure drive further includes the steps of:

(a) removing fluid from the riser in front of the pig to enable pig travel;
   (b) reducing shoreline pressure;

(c) opening the valve to enable pig passage from the riser and into the shoreline responsive to the pressure drive behind the pig pushing the pig; and (d) after pig passage, closing the valve and then operating the shoreline at a set pressure to pump the pig to shore.

9. The method of claim 8 operating the shoreline further includes the step of pumping produced oil well production into the shoreline at the set pressure and including the step of normally pressure isolating the riser from the shoreline except for pig passage.

10. The method of claim 9 wherein removing from the riser further includes the step of venting riser fluid through the vent valve before the pig passes through the vent valve.

11. The method of claim 10 wherein forming the pig further includes the step of forming the body of the pig of N discs spaced by foam donuts, and said discs and said donuts are centered on a central post, and N is a positive integer.

12. The method of claim 11 wherein said discs are resilient and able to fit into said riser.

13. The method of claim 10 wherein forming the pig further includes the steps of forming the pig body of donuts of light foam open cell plastic of about 3 to 12 pounds per cubic feet.

14. A pig for use in the method of claim 1 comprising:

(a) a nose portion as defined at claim 1(c) having a forward nose disc of resilient material harder than about 75 durometer and having a diameter smaller than the inside diameter of the riser;

(b) a second and parallel disc of resilient material harder than about 75 durometer and having a diameter larger than the inside diameter of the shoreline; and (c) foamed open cell plastic donut between said discs having a larger diameter than said second disc and having a density greater than about three pounds per cubic foot.

15. The pig of claim 14 including at least two of said second discs, and including a separate foamed open cell plastic donut adjacent thereto.

16. A pig for cleaning an offshore pipeline connected to a riser wherein said pipeline has an inside diameter and said riser has a smaller inside diameter than said pipeline inside diameter said pig, comprising:

(a) a nose disc defining the forward end of said pig, and having a diameter enabling said nose disc to be inserted into said riser inside diameter;

(b) a parallel pig body disc behind said nose disc having a diameter greater than said pipeline inside diameter;

(c) a foamed, tapered, nose donut positioned between said nose and body discs to space said discs apart, wherein said nose disc truncates an apex of said nose donut;

(d) a second foamed circular donut comprising a specified portion of the pig body length and having a diameter greater than said disc; and (e) wherein
 (i) said body disc and said donuts are formed of compressible materials to enable passage into and through said riser and said pipeline, and
 (ii) said nose disc is made of material harder than the nose and second donuts.

17. The pig of claim 16 including N body discs and N donuts spaced adjacent thereto wherein said body discs and donuts are serially alternating along said body, and wherein N is a positive integer.

18. The pig of claim 17 wherein said discs are sized to at least 1% greater in diameter than said pipeline inside diameter, and said donuts are about 4% larger in diameter than said discs.

19. The pig of claim 18 including a spiral strip on said pig formed of a multitude of points for scratching said pipeline inside diameter.

20. The pig of claim 19 wherein said points are randomly oriented carbide particles.

* * * * *